United States Patent Office
3,505,372
Patented Apr. 7, 1970

3,505,372
ONIUM SALTS CONTAINING METAL
COMPLEXES AS THE ANIONS
George Josh, deceased, late of Crown Point, Ind., by Frances J. Josh, executrix, Crown Point, Ind., and David Taber, Evanston, and Thomas A. Schenach, Chicago Ridge, Ill.; said Taber and said Schenach assignors to Armour and Company, Chicago, Ill., a corporation of Delaware
No Drawing. Filed Nov. 23, 1966, Ser. No. 597,197
Int. Cl. C07f 3/10, 1/10; C07d 105/00
U.S. Cl. 260—431
3 Claims

ABSTRACT OF THE DISCLOSURE

Onium salts containing a metal complex as the anion in accordance with the invention conform to the general structural formula:

$$Z_x[M_p(L)_n]_y$$

are disclosed wherein Z is an onium ion selected from the group consisting of ammonium—$(NH_4)^+$, quaternary ammonium—$(NR_4)^+$, ternary sulfonium—$(SR_3)^+$, hydronium—$(H_3O)^+$, substituted hydronium—$(R_2HO)^+$, pyridinium—$(C_5H_5NH)^+$ and quaternary phosphonium—$(PR_4)^+$, wherein R is an alkyl radical containing from 1 to 18 carbon atoms; M is a metal cation; L is a ligand capable of forming coordination bonds with M; $x$, $p$ and $y$ are integers from 1 to 3; and $n$ is an integer of from 1 to 6. The compounds have utility as fabric conditioners, for example sizes, finishes and in dyes, and in antisepsis, for example soap germicides, foot powders and dusting powders for rashes and burns.

---

This invention relates generally to chemical compounds having certain characteristic properties and uses which result directly from the presence of a particular metallic constituent. This invention relates more specifically to a new class of chemical compounds in which the anion is a metal complex and the cation is an onium moiety.

There are many chemical compounds which possess commercial utility because of the constituent metal ion, but numerous instances exist wherein the chemical compound that is the ordinary source of the metal ion is lacking in other desired properties or wherein the ion itself has accompanying disadvantages. Silver ion, derived from the soluble nitrate for example, is germicidally active having a desirably potent effect against such gram negative organisms as *Escherichia coli* and *Pseudomonas aeruginosa*. However, light is known to reduce silver ion to the metal whereby to attenuate its germicidal efficiency and whereby to develop a source of discoloration. Various salts of mercury likewise have many uses, particularly in the textile industry and in the medical field; but mercury salts must be handled carefully and used judiciously because they possess substantial human toxicity.

The present invention takes as an important object the overcoming of such problems in the use of metal ions; and in particular, the invention takes as an object the provision of a new type of salt which terminates, minimizes or ameliorates one or more undesirable properties of a component metal ion while preserving or enhancing the desirable effects and properties thereof.

Another object of the invention is to provide a new class of chemical compounds in which the anion is a metal complex and in which the cation is an onium moiety.

These and other objects and features of the invention become more apparent from a consideration of the following descriptions.

In accordance with the present invention, the novel compounds contemplated have been produced by combining stoichiometric amounts of a soluble salt containing the characteristizing metal ion and a soluble salt containing the selected complexing anion in a suitable solvent such as water. Upon formation of the desired metal complex, a selected onium salt is introduced and allowed to react forming the lutimate compound. Frequently, the end product is insoluble in or immiscible with the chosen solvent and therefore precipitates as a solid or forms a distinct liquid phase.

Onium salts containing a metal complex as the anion in accordance with the invention conform to the general structural formula:

$$Z_x[M_p(L)_n]_y$$

wherein Z is an onium ion; M is a metal cation; L is a ligand capable of forming coordination bonds with M; $x$, $p$ and $y$ are integers from 1 to 3; and $n$ is an integer from 1 to 6.

Onium cations suitable for use in the invention include ammonium—$(NH_4)^+$, quaternary ammonium—$(NR_4)^+$, ternary sulfonium—$(SR_3)^+$, hydronium—$(H_3O)^+$, substituted hydronium—$(R_2HO)^+$, pyridinium—$(C_5H_5NH)^+$, and quaternary phosphonium—$(PR_4)^+$, wherein R is an alkyl radical containing from 1 to 18 carbon atoms.

Quaternary ammonium ions have proved especially useful in the invention. When the onium cation is selected to be quaternary ammonium, the ultimate compound is readily separated from solvent water used as the reacting medium. Other special advantages obtain when the onium cation is selected to be quarternary ammonium, especially when the characterizing metal ion of the ultimate compound is employed for its germicidal effect. Among these properties in the continued germicidal effectiveness of the compound in the presence of soap, cationic detergent materials such as quaternary ammonium compounds being characteristically inactive germicidally in the presence of soap. In addition, when the onium cation is selected to be quaternary ammonium and when the characterizing metal ion is selected for its germicidal activity, the resultant compounds of the invention have exhibited superior effectiveness against pseudomonas micro-organisms.

The anion which is combined with the onium cation of the present compounds is a metal complex in which the metal ion itself contributes substantial characterizing properties to the ultimate compound and the particular metals which find utility in the invention are those which possess the property of forming very stable complexes. This property is strongly exhibited by most transition metals, in particular those of Group I–B (copper, silver and gold), Group II–B (zinc, cadmium and mercury), and Group VIII (iron, cobalt and nickel). The particular metal ion for use in the formation of a given compound of the invention is selected in consideration of its own individual properties. For example, a germicidally active metal ion, such as silver ion, is selected where an antiseptic end use is contemplated. Soluble compounds such as the nitrate and the iodate are preferred as sources of the metal ion because of their facility in forming the complex in water solution. However, any compound having a higher disassociation constant than the complex ion to be formed may be employed.

The ligand which is combined with the metal ion in forming the compounds of the invention is selected from those compounds which are capable of forming coordination bonds with the described metal ion to form a stable anionic complex. Of course, it is to be expected that the same ligand will not complex equally well with all the metals of the invention. For example, ethylenediaminetetraacetic acid forms very stable anionic complexes with iron, cobalt, and zinc, but not with silver. Furthermore, some ligands may form complexes of acceptable stability but are of limited utility because of their toxicity, e.g. cyanide and thiocyanate. Ligands such as ammonia, amines, and phosphines form cationic complexes with metals and are not useful in this invention. Among the numerous complexing agents which may be employed in this invention are fluoride, chloride, sulfide, thiosulfate, ethylenediaminetetraacetate, thiosulate, citrate, oxalate and phosphate. Exemplary complexes formed of such ligands include thiosulfatoargentate $Ag(S_2O_3)_2^{3-}$, tetrachloromercurate, $HgCl_4^{2-}$ and hexafluoroferrate, $FeF_6^{3-}$.

The compounds of the invention have utility as fabric conditioners, for example sizes, finishes and in dyes, and in antisepsis, for example soap germicides, foot powders and dusting powders for rashes and burns.

In order to describe the invention more fully, the following specific examples are given without, however, intending to limit the invention to the precise details and conditions set forth except as required by the appended claims.

EXAMPLE I

Sufficient mercury bichloride, hydrochloric acid and water were combined to make a solution containing 5.4 grams (0.02 mole) of tetrachloromercurate complex ion per 100 ml. A one hundred ml. aliquot of the resulting solution was added slowly to 80 grams of a 13.5% solution of 2-butene-1,4-bis (dimethyl dodecyl ammonium chloride) (0.02 mole). A white precipitate formed immediately; and thereafter, the water was removed from this solid by decantation. Fresh water was then added and the solid precipitate was filtered, washed well and air-dried. The 2-butene-1,4-bis(N,N-dimethyl-N-dodecyl-ammonium) tetrachloromercurate produced by the described reaction was determined to be 87% pure by titration with standard anionic. Use of this material as a soap germicide was contemplated and bacteriological studies were conducted.

A suspension of the quaternary ammonium mercurial chloride was prepared in a 10% soap solution. Total concentration of the onium compound in the soap solution was 1,000 p.p.m. Thereafter, serial dilutions were made, and varying amounts of the resultant soap solution were thoroughly dispersed in measured amounts of sterile liquid nutrient agar at concentrations ranging from 0.05 to 20 p.p.m. The soap utilized in this test was a neutral white toilet soap containing about 20% by weight of sodium coconut oil soap and 80% by weight of sodium tallow soap. Plates were poured, solidified and streaked with a standard 4 mm. loopful of a 24-hour broth culture of *Staphylococcus aureus* strain F.D.A. No. 209. After incubation for 24 hours at 37° C., the bacteriostatic endpoint was determined. This endpoint represented the concentration of onium compound in p.p.m. necessary to inhibit growth of the inoculant organism completely. An endpoint of 1–10 p.p.m. was determined.

A similar determination using *Escherichia coli* as the test organism gave an endpoint of 5–10 p.p.m.

EXAMPLE II

A bis-quaternary ammonium thiosulfatoargentate was prepared by first combining 3.40 grams of silver nitrate (0.02 mole) and 6.32 grams of sodium thiosulfate (0.04 mole) in 100 ml. of water. To the resultant solution, 120 grams of a 13.5% solution of 2-butene-1,4-bis(N,N-dimethyl-N-dodecyl-ammonium chloride) (0.03 mole) was added slowly. A white solid precipitate formed, and this material was determined to be insoluble in water and dimethylformamide but soluble in excess of the bis-quaternary ammonium chloride and in hot ethanol.

Bacteriostatic endpoints for the bis-quaternary ammonium thiosulfatoargentate were determined using the agar streak method in the presence of soap according to the procedure described in Example I. An endpoint of 5–10 p.p.m. against *E. coli* was obtained; and endpoints of 5–10 p.p.m. and 10–20 p.p.m. respectively were established for *Pseudomonas aerugenosa* and *Staphylococcus aureus*. By comparison a conventional soap germicide, namely 2,2'-methylenebis(3,4,6-trichlorophenol), exhibited bacteriostatic endpoints in excess of 80 p.p.m. in the same tests against *E. coli* and *Ps. aerugenosa*.

The light stability of the bis-quaternary ammonium thiosulfatoargentate was determined by exposing a sample of the material to sunlight for three days. From the bacteriostatic standpoint, the exposed material was only slightly inferior to corresponding unexposed samples, showing a bacteriostatic endpoint of 20–30 p.p.m. against *E. coli* and an endpoint of 10–15 against *Ps. aerugenosa* and thus indicating a stabilization of the silver ion with respect to light.

EXAMPLE III

An alkyl benzyl dimethyl quaternary ammonium bis-thiosulfatoargentate was prepared from stoichiometric amounts of the quaternary ammonium chloride, silver nitrate and sodium thiosulfate. The quaternary salt containing from 10 to 16 carbon atoms in the alkyl group was selected as the starting material, and equivalent amounts of silver nitrate and sodium thiosulfate were combined first in water. Thereafter, a water solution of the quaternary ammonium chloride was introduced slowly until a 3:2 molar ratio was achieved between the silver complex and the quaternary compound. As the quaternary was added to the primary solution, an oily, white, semi-solid material precipitated out of the solution. The water and its soluble constituents were then decanted from this material, and the solid product itself was washed with water, filtered and air-dried.

The quaternary ammonium thiosulfatoargentate of this example was incorporated into a tallow-coconut oil soap bar at a level of 1% by weight. In subjective evaluations employing a panel test technique, the resultant soap bar exhibited deodorant properties; and when stored in a drawer with only occasional exposure to light, sample bar appeared to retain the same degree of observed activity. Upon normal use of the soap bar over a period of three days under exposure to ambient light levels, the soap bar appeared to retain substantially all of its germicidal effectiveness.

Soap solutions of the quaternary amonium thiosulfatoargentate of this example were prepared in accordance with the procedure outlined in Example I, and bacteriological studies were conducted using the agar streak method which has also been described hereinabove with respect to Example I. Bacteriostatic endpoints of 10–20 p.p.m. against *E. coli* and 5–10 p.p.m. against *S. aureus* strain F.D.A. No. 209 were determined. By comparison, the quaternary ammonium salt used in preparing the onium compound of this example exhibited corresponding endpoints of greater than 50 p.p.m. and greater than 10 p.p.m. respectively.

From the foregoing experimental work, it will be apparent that the germicidal effectiveness of certain metal ions has been preserved under conditions which would normally result in inhibition of or rapid deterioration of this property.

It is, therefore, contemplated to cover by the present application any and all such modifications as fall within the true spirit and scope of the appended claims.

The invention is claimed as follows:

1. A salt having the general structural formula:

$$Z_x[M_p(L)_n]_y$$

wherein Z is an onium ion selected from the group consisting of $-(NR_4)^+$, and pyridinium $-(C_5H_5NH)^+$ and wherein R is an alkyl radical containing 1 to 8 carbon atoms; M is a metal cation selected from the group consisting of silver and mercury; L is a ligand capable of forming coordination bonds with M to form a stable anionic complexes and selected from the group consisting of chloride and thiosulfate; and wherein $x$, $p$ and $y$ are integers of 1 to 3; and $n$ is an integer of from 1 to 6.

2. A salt according to claim 1 wherein said onium ion is a quaternary ammonium ion selected from the class consisting of 2 - butene-1,4-bis(N,N-dimethyl-N-dodecylammonium), alkyl trimethylammonium and alkyldimethylbenzylammonium and wherein the alkyl radicals contain from to 10 18 carbon atoms.

3. 2 - butene-1,4-bis(N,N-dimethyl-N-dodecylammonium) tetrachloromercurate.

References Cited

UNITED STATES PATENTS

| | | |
|---|---|---|
| 1,115,610 | 11/1914 | Spiess et al. _____ 260—430 XR |
| 2,274,058 | 2/1942 | Goebel et al. _____ 260—431 XR |
| 2,080,143 | 5/1937 | Lubs et al. _____ 260—429.9 XR |
| 2,513,793 | 7/1950 | Frommel _____ 260—430 XR |
| 2,580,473 | 1/1952 | Sowa et al. ____ 260—429.3 XR |
| 2,886,580 | 5/1959 | Hintzmann et al ____ 260—438.1 |
| 2,902,401 | 9/1959 | Harwood et al __ 260—439 XR |
| 2,909,543 | 10/1959 | Weesner _____ 260—429.9 XR |
| 2,924,552 | 2/1960 | Harwood et al. __ 260—438.1 XR |
| 2,928,856 | 3/1960 | Harwood et al _____ 260—438.1 |
| 2,993,923 | 7/1961 | Warner et al. _____ 260—438.1 |
| 2,798,103 | 7/1957 | Schaeffer et al. |
| 3,254,102 | 5/1966 | Swanson. |
| 3,294,827 | 12/1966 | Swanson. |
| 3,374,256 | 3/1968 | Driscoll et al. ____ 260—430 XR |
| 2,738,364 | 3/1956 | Reppe et al. _____ 260—270 XR |
| 3,254,102 | 5/1966 | Swanson _____ 260—429 |

OTHER REFERENCES

Bailar: Chem. Coordination Compounds. Reinhold Publ. Corp., Balt., Md. (1950), pp. 1, 11, 208, 356, 357, 658 and 660.

Jaselskis et al.: J. Amer. Chem. Soc, vol. 80, pp. 4197–4198 (1958).

Index Chemicus, vol. 18, No. 7 (1965) Article 55983.

J. Inorg. and Nucl. Chem. vol. 26, pp. 665–667 (1964).

Straumanis et al.: Zeit. Anorg. Allgem. Chem. vol. 234 pp. 17–22 (1937).

TOBIAS E. LEVOW, Primary Examiner

H. M. S. SNEED, Assistant Examiner

U.S. Cl. X.R.

260—429, 430, 270, 438.1, 429.9, 439